Figure 1:
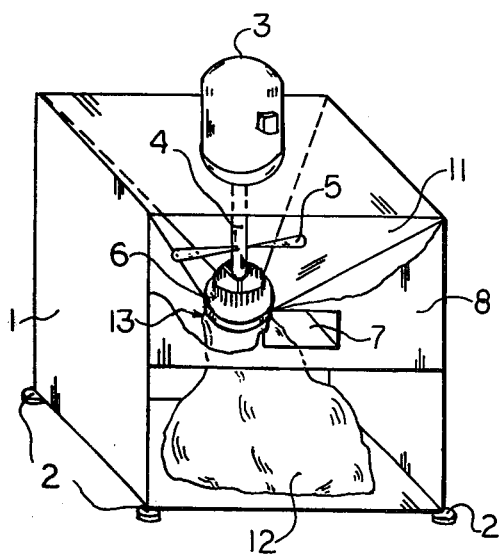

United States Patent [19]

Bertaglia

[11] 4,151,626
[45] May 1, 1979

[54] MACHINE FOR CLEANING CUP SHAPED FILTERS, ESPECIALLY THOSE USED FOR "EXPRESSO" COFFEE

[75] Inventor: Natale Bertaglia, Bologna, Italy

[73] Assignee: Beta S.r.l., Bologna, Italy

[21] Appl. No.: 847,327

[22] Filed: Oct. 31, 1977

[51] Int. Cl.² ............................................. A46B 13/02
[52] U.S. Cl. ...................................... 15/56; 15/21 R
[58] Field of Search ................. 15/21 R, 21 C, 36, 56, 15/101; 210/396

[56] References Cited

U.S. PATENT DOCUMENTS

| 2,997,726 | 8/1961 | Bernard | 15/21 C |
| 3,439,370 | 4/1969 | McLaughlin | 15/21 R X |

Primary Examiner—Edward L. Roberts
Attorney, Agent, or Firm—Martin A. Farber

[57] ABSTRACT

A machine for cleaning cup-shaped filters, particularly those for "expresso" coffee, having a substantially closed casing divided into an upper and a lower portion, the upper portion containing a brush shaped in the form of a cup and driven by an electric motor disposed outside of the casing, a hopper narrowing downwardly in the casing for collecting coffee grounds and a bag container releaseably positioned in the lower part connected to the hopper for receiving the coffee grounds. The casing is provided with an opening adjacent the brush for insertion of the filter to be cleaned.

6 Claims, 2 Drawing Figures

U.S. Patent  May 1, 1979  4,151,626

MACHINE FOR CLEANING CUP SHAPED FILTERS, ESPECIALLY THOSE USED FOR ESPRESSO COFFEE

This invention relates to a machine for cleaning cup shaped filters, especially those used for "expresso" coffee.

It is known that in bars, filters of the type provided with a long handle used on "expresso" coffee machines contain residual coffee powder, known as "grounds", which are cleaned out by banging the filter on the edge of a wooden box placed in the immediate vicinity of the machine.

This system, despite the obvious advantages of speed it offers, is anti-hygienic due to of the grounds which build up in the box and the fact that the filter itself is not cleaned properly.

It is an object of the present invention to provide a machine which makes it possible to quickly clean the filters in a protected place and to accumulate the grounds in disposable containers. Since the containers are disposable, prevents dregs from collecting for a long time in the region of "expresso" coffee machines.

In order to achieve this object of the invention, a box shaped casing is provided, which is closed on all sides except one; on this one side only the top half is closed.

Inside the casing there is provided a hopper shaped in the form of a downwardly pointing funnel. A container is secured to the funnel by means of a clamp. The container is made of a plastic material which is transparent so that the contents therein can be seen therethrough.

An electric motor is rigidly mounted on the cover of the casing and by means of a shaft drives an impeller and a cup-shaped brush, the latter being mounted on the lower extremity of the shaft.

A casing opening is formed in the closed part of the wall of the casing. This casing opening allows the filter which is mounted on a handle to be inserted into the casing through the casing opening. In this way the filter is placed inside the hopper in the casing at the place where the rotating brush is positioned. The brush then removes the residual grounds from the filter. The coaxially mounted impeller helps push the grounds down through the hopper and into the bag container positioned therebelow, the container being in the form of a bag container.

Due to the fast removability of the containers, it is possible to comply with the hygiene standards required for the bar.

Figure 2:
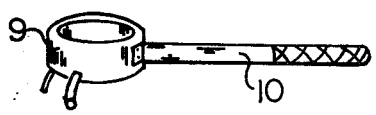

With the above and other objects and advantages in view, the present invention will become more clearly understood in connection with the detailed description of a preferred embodiment, when considered with the accompanying drawing, of which:

FIG. 1 is a perspective view, partially broken away and with the front inclined wall of the hopper removed for clarity of illustration, of the cleaning machine of the invention; and FIG. 2 is a perspective view of a filter with handle which is adapted to be cleaned in the cleaning machine of FIG. 1.

The cleaning machine of the invention comprises a casing 1 resting on four feet 2, the latter being provided with suction pads to ensure stability.

The cover of the casing has an electric motor 3 thereon keyed for operating a shaft 4, and the latter has mounted thereon an impeller 5 and a cup shaped brush 6.

Because of an opening 7 made in the closed upper half wall 8, it is possible to insert the handle 10 with its filter 9 (see FIG. 2) into the casing at the position of the brush 6.

The cleaning operation takes place in the following way: the person making the coffee holds the handle 10 and inserts the filter 9 through the opening 7, placing it an the brush 6.

Because of its rotation by the shaft 4, the brush 6 brushes the filter 9 and expels the coffee grounds from the filter while the impeller 5 helps push the dregs downwardly in the hopper 11, from which they pass into the container 12, the latter being connected to the hopper 11 by means of a flexible clamp 13.

After the clamp 13 is released, the container 12 can be removed through the open lower half of the side under the wall 8.

By dividing the casing 1 into two areas, with the upper area completely closed except for the opening 7 for insertion of the filter 9, the grounds are prevented from spilling out of the machine and from soiling the surrounds.

While I have disclosed one embodiment of the invention it is to be understood that this embodiment is given by example only and not in a limiting sense.

1. A machine for cleaning cup-shaped filters, particularly those used for "expresso" coffee, comprising
   a substantially closed casing divided into an upper part and a lower part, the upper part including a top cover,
   a hopper downwardly narrowing and disposed substantially in said upper part, said hopper having a narrowmost exit opening at the bottom thereof,
   an electric motor mounted on said top cover outside said casing and including a motor shaft extending through said cover into the interior of said casing longitudinally through said hopper, said shaft having a free end,
   a bag container removably disposed in the lower part and including means for connecting said bag container on the bottom of said hopper communicating with said exit opening of said hopper,
   a cup-shaped brush formed as an annulus crown secured to said free end of said shaft,
   said upper part of said casing is formed with a casing opening adjacent said brush,
   a cup-shaped filter substantially complementary to said brush and removably insertable in said casing opening into said hopper with said brush extending therein.

2. The machine for cleaning cup-shaped filters, as set forth in claim 1, further comprising
   an impeller keyed on said shaft between said motor and said brush.

3. The machine for cleaning cup-shaped filters, as set forth in claim 1, wherein
   said bag container is transparent,
   said connecting means comprises clamp means for rapid connection and removal of said container to and from said hopper.

4. The machine for cleaning cup-shaped filters, as set forth in claim 1, wherein
   said brush is formed with radially extending spokes having radial inner ends connected to said free end of said shaft and having radial outer ends of said spokes connected to said crown.

5. The machine for cleaning cup-shaped filters, as set forth in claim 1, wherein
said exit opening of said hopper is substantially centrally aligned with said brush and said shaft,
said casing opening is substantially equal in cross-section to a cross-section of said filter.

6. The machine for cleaning cup-shaped filters, as set forth in claim 1, wherein
said casing defines a rectangular box having four sides,
said casing is closed completely on said upper part except for said casing opening, and is closed on three of the sides of said lower part defining an enlarged opening in said lower part between two of said sides for removal of said bag container therethrough,
said filter has a handle connected thereto extending through said casing opening when said cup-shaped filter is disposed in said hopper,
said hopper constitutes four inclined planar surfaces converging downwardly adjacent to said sides of said casing,
said casing opening in said upper part and said enlarged opening in said lower part are on a common side of said casing.

* * * * *